Feb. 23, 1937.  E. CULVER ET AL  2,071,616
MULTIFOCAL LENS
Filed Nov. 9, 1934

INVENTORS
EDWARD CULVER
STANLEY A. EMERSON
BY
ATTORNEYS

Patented Feb. 23, 1937

2,071,616

UNITED STATES PATENT OFFICE 2,071,616

MULTIFOCAL LENS

Edward Culver and Stanley Alfred Emerson, London, England, assignor, by mesne assignments, to United Kingdom Optical Company, Limited (1936), London, England Application November 9, 1934, Serial No. 752,305
In Great Britain June 29, 1934

2 Claims. (Cl. 88—54)

This invention relates to multifocal lenses and, in particular, to lenses providing a plurality of visual fields of different powers by inserting segments within a major blank.

One object of our invention is to provide a multifocal lens of three or more powers wherein the minor visual fields are arranged adjacent to one another and consist of inserts of differently refractive glass from that of the major blank.

Another object is to provide a multifocal lens of three or more powers with the minor visual fields arranged adjacent to one another, these minor fields being of such form as to provide a wide horizontal field of view, and to minimize the prismatic displacements occurring at the upper dividing lines thereof.

Another object is to provide a trifocal lens having intermediate and reading inserts arranged adjacent to one another; these inserts being located in a major lens, and having upper dividing lines which are of different outline from the outline of the remainder of the dividing lines, so as to place the optical centers of the inserts in close proximity to these upper dividing lines and thus minimize the prismatic displacements arising thereacross.

Another object is to provide a trifocal lens having reading and intermediate inserts arranged adjacent to one another and partially overlapping, these inserts being formed of composite buttons, one portion of each button being composed of glass of substantially the same refractive index as the major lens, whereby to make the upper dividing lines of the inserts substantially closer to their optical centers than the remainder of the dividing lines; this provision resulting in a pair of inserts having widths of field equivalent to those of large segments with prismatic displacements at their upper dividing lines similar to those of small segments.

Another object is to provide a trifocal lens of the above description wherein the countersinks for the intermediate and reading visual portions are arranged side by side and partially overlapping, so as to provide a minimum insert thickness, and, therefore, a minimum lens thickness.

Another object is to provide a trifocal lens having an intermediate portion arranged above and of somewhat smaller extent than the reading portion, the upper dividing lines of these portions being substantially flatter than the remainder thereof, so as to provide a small intermediate portion and a large reading portion, yet with a minimum of image jump due to prismatic effects at the upper dividing lines.

Another object is to provide a quadrifocal lens of this type wherein the successive inserts are of glass of substantially the same refractive indices, these inserts being made from composite buttons, one portion of each button being of substantially the same refractive index as the major blank into which these inserts are fused.

Another object is to provide a method of making a trifocal or multifocal lens wherein the successive inserts or segments are of composite construction and are caused to overlap one another, thereby providing fields which are located adjacent to one another rather than having one field surrounded by another, and also providing a means of maintaining any desired vertical width of the upper insert while placing the centers of the segment circles at different positions or separations, thus permitting control of the centration and prismatic effects of the minor field independently of the vertical width of the upper minor field.

Referring to the drawings.

The lens of this invention comprises a trifocal lens in which the dividing line between the intermediate and reading portion does not change in curvature, comprising a composite button fused in overlapping depressions in the major portion.

Figure 1:
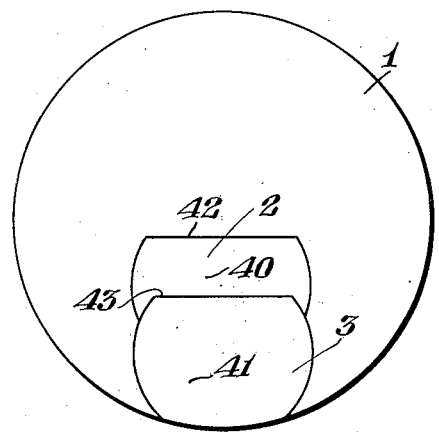
Figure 1 is a front elevation of a trifocal lens according to our invention.
Figure 2:
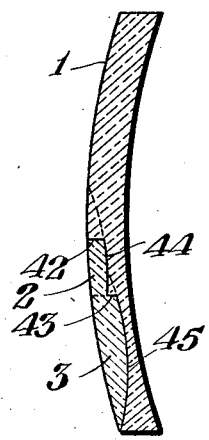
Figure 2 is a central vertical section through the trifocal lens of Figure 1.

The blank 1 is composed of a glass of low index refraction. The major portion is provided with an intermediate portion 2 and a reading insert 3. The bottom 2 is of the composite type. In the illustrations the composite buttons have been shown with the component parts uniting on straight edges. They may, however, be made any shape desired. It will be seen from Figure 2 that the lines bounding the top and bottom of the intermediate portion now both have slightly visible buried shoulders. The centres of the intermediate and reading portions are shown in Figure 1 at 40 and 41, the upper dividing lines being 42 and 43. The two countersink depression curves 44 and 45 are shown in Figure 2 and it will be seen that their line of intersection is not now the dividing line between the intermediate and reading portions. The dividing line is the line 43 and the curved lines formed by the intersection of the intermediate countersink and the reading countersink. This dividing of straight center portion and curved side portions comprises the buried stepped portion. The curved portions at each end join the line 43, and the contour portions of the reading and intermediate portions 2 and 3 respectively.

The size of the intermediate portion is not limited by the size of the reading portion in this construction, and this portion can therefore be of varied sizes. Freedom of choice as to size of each countersink radii and both buttons themselves is thus attained; nor need the various countersinks be the same for a given thickness of button, and a free choice of narrower or wider radii of countersinks be obtained in this improved construction.

Thus it will be seen that we have provided a multifocal lens in which the various countersinks are of such shallow curvature as to produce a thin and light lens. By the provision of wide inserts we have afforded wide horizontal fields of view, yet kept the prismatic effects at the upper dividing lines down to the low amounts present with small segment lenses by our use of the composite buttons previously described. By this same construction, the optical centers of these inserts have been placed at the points where the wearer most conveniently looks through his lenses. Thus the prismatic effects normally present at such points in the ordinary bifocal inserts are eliminated by our construction, since no prismatic effect exists at the optical center of a lens. The shoulders between the upper dividing lines and the distance portion are correspondingly small and are accordingly inconspicuous except upon the most careful inspection at close range. The various inserts overlap one another, thereby enabling them to be of substantially the same widths and to have lines of joinder of a wide extent between successive inserts. The positions and/or separations of the centers of the intermediate and reading inserts may also be varied without changing the vertical width of the horizontally elongated area forming the upper insert. This gives an opportunity of controlling the centration and prismatic effects of the intermediate and reading portions without requiring one of these to be made wider or narrower vertically, as has hitherto been the case. Such control is found especially desirable where the wearer's right eye requires a lens of different power than his left eye.

We desire to comprehend within our invention such modifications as may be embraced within our claims and the scope of our invention.

Having thus fully described our invention, what we claim as new and desire to secure by Letters Patent, is:

1. A trifocal lens comprising a major portion, an intermediate portion and a reading portion, said reading and intermediate portions being of different radii and having curved boundary lines, said intermediate portion having a substantially flat shouldered top line, the line between the reading and intermediate portions comprising a substantially flat line comprising a buried stepped portion, and curved lines joining the boundary lines of the reading and intermediate portions comprising buried curved portions, said curved portions also joining the buried stepped portion.

2. A trifocal lens comprising a major portion, an intermediate portion and a reading portion, said reading and intermediate portions being of different radii and having curved boundary lines, said intermediate portion having a substantially flat shouldered top line, the line between the reading and intermediate portions comprising a substantially flat line comprising a buried stepped portion, and curved lines joining the boundary lines of the reading and intermediate portions comprising buried curved portions, said curved portions also joining the buried stepped portion, said reading and intermediate portions being of different thickness.

EDWARD CULVER.
STANLEY ALFRED EMERSON.